(12) United States Patent
Ni et al.

(10) Patent No.: US 11,005,766 B1
(45) Date of Patent: May 11, 2021

(54) PATH PROFILING FOR STREAMING APPLICATIONS

(71) Applicant: International Business Machines Corporation, Armonk, NY (US)

(72) Inventors: Xiang Ni, White Plains, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/840,737

(22) Filed: Apr. 6, 2020

(51) Int. Cl.
| *H04L 12/853* | (2013.01) |
| *H04L 12/801* | (2013.01) |
| *H04L 12/24* | (2006.01) |
| *H04L 12/26* | (2006.01) |

(52) U.S. Cl.
CPC ........ *H04L 47/2416* (2013.01); *H04L 41/083* (2013.01); *H04L 41/22* (2013.01); *H04L 43/045* (2013.01); *H04L 43/062* (2013.01); *H04L 47/15* (2013.01)

(58) Field of Classification Search
CPC ... H04L 47/2416; H04L 47/15; H04L 47/083; H04L 47/22; H04L 43/062; H04L 43/045
See application file for complete search history.

(56) References Cited

U.S. PATENT DOCUMENTS

| 7,194,664 | B1 | | 3/2007 | Fung | |
| 7,532,613 | B1 | * | 5/2009 | Sen | ........................ H04L 47/724 370/352 |
| 7,890,649 | B2 | | 2/2011 | Gu | |
| 7,926,043 | B2 | | 4/2011 | Vaswani | |
| 8,250,473 | B1 | * | 8/2012 | Haynes | ............... G06Q 30/0201 715/736 |
| 8,271,409 | B2 | | 9/2012 | Luo | |
| 8,656,369 | B2 | | 2/2014 | Allen | |
| 8,719,481 | B2 | | 5/2014 | Hesse | |
| 10,552,298 | B2 | * | 2/2020 | Cancilla | ............... G06F 11/3636 |
| 10,691,489 | B2 | * | 6/2020 | Barsness | ............... G06F 9/4881 |
| 2002/0022952 | A1 | * | 2/2002 | Zager | .................. H04L 41/0233 703/22 |

(Continued)

OTHER PUBLICATIONS

Jacques-Silva et al., "Consistent Regions: Guaranteed Tuple Processing in IBM Streams," Proceedings of the VLDB Endowment, vol. 9, No. 13 Copyright 2016 VLDB Endowment 2150-8097/16/09. (Year: 2016).*

(Continued)

*Primary Examiner* — Alina A Boutah
(74) *Attorney, Agent, or Firm* — Joseph P. Curcuru

(57) ABSTRACT

In an approach to improve online path profiling by identifying heavy trafficked paths in streaming applications embodiments track data tuples through a streaming application. Embodiments consist of periodically executing a tuple submission application programming interface (API) and a tuple processing API. Additionally, embodiments record active paths using a profiler thread by taking snapshots of a current path index across threads. Furthermore, embodiments generate path usage information based on the recorded active path, generate a path usage graph based on the path usage information; and optimize identified trafficked paths based on the path usage data and path usage map.

20 Claims, 8 Drawing Sheets

(56) References Cited

U.S. PATENT DOCUMENTS

| | | | | |
|---|---|---|---|---|
| 2011/0289301 | A1 | 11/2011 | Allen | |
| 2014/0059212 | A1* | 2/2014 | Gedik | G06F 9/5066 709/224 |
| 2015/0381515 | A1* | 12/2015 | Mattson | H04L 47/70 707/609 |
| 2016/0012110 | A1* | 1/2016 | Hirzel | G06F 16/2291 707/797 |
| 2019/0190972 | A1* | 6/2019 | Carey | H04L 65/60 |
| 2019/0258558 | A1* | 8/2019 | Beuch | G06F 11/3065 |
| 2020/0028762 | A1* | 1/2020 | Sun | H04L 41/22 |

OTHER PUBLICATIONS

Gabriala Jacques da Silva, "Guaranteed tuple processing with consistent regions," Aug. 24, 2020. (Year: 2020).*

"Intel® VTune™ Amplifier|Intel® Software", printed on Dec. 5, 2019, 6 pages, <https://software.intel.com/en-us/vtune>.

Ball et al., "Efficient Path Profiling", © 1996 IEEE, 12 pages.

De Pauw et al., "Streamsight—a Visualization Tool for Large-Scale Streaming Applications", Softvis 2008, Herrsching am Ammersee, Germany, Sep. 16-17, 2008, @ 2008 ACM 978-1-60558-112-5/08/ 0009, 10 pages, <https://dl.acm.org/citation.cfm?doid=1409720. 1409741>.

De Pauw et al., "Visual Debugging for Stream Processing Applications", G. Roşu et al. (Eds.): RV 2010, LNCS 6418, pp. 18-35, 2010, © Springer-Verlag Berlin Heidelberg 2010, 18 pages.

Filgueira et al., "dispel4py: An User-friendly Framework for Describing eScience Applications", Proceedings of 11th IEEE eScience 2015, Munich, Germany, Sep. 1-4. IEEE, pp. 454-464. DOI: 10.1109/eScience.2015.40, 12 pages.

Hoffmann et al., "SnailTrail: Generalizing Critical Paths for Online Analysis of Distributed Dataflows", This paper is included in the Proceedings of the 15th USENIX Symposium on Networked Systems Design and Implementation (NSDI '188), Apr. 9-11, 2018, Renton, WA, USA, 17 pages.

* cited by examiner

| PATH | TOTAL USAGE | TRAFFIC FLOW | | | | |
|------|-------------|---|---|---|---|---|
| 702 | 40% | OP 1 →5%→ | OP 2 →5%→ | OP 5 →30%→ | OP 6 | |
| 704 | 40% | OP 1 →5%→ | OP 3 →35%→ | OP 5 | ///// | |
| 706 | 10% | OP 1 →5%→ | OP 4 →2%→ | OP 5 →3%→ | OP 6 | |
| 708 | 10% | OP 1 →3%→ | OP 3 →5%→ | OP 5 →2%→ | OP 6 | |

FIG. 7

PATH PROFILING FOR STREAMING APPLICATIONS

BACKGROUND

The present invention relates generally to the field of streaming applications, and more particularly to profiling data paths in streaming applications.

Tuple flowing information is important for developing and tuning streaming applications. A tuple is generally a sequence of objects, whether immutable or mutable, for an interpreted, high-level, general purpose programing language. Tuples are sequences, just like lists. Creating a tuple is as simple as entering different comma-separated values. In general, flows are a set of packets which share a common property. However, the most important of such properties are the flow's endpoints. For example, the simplest type of flow is a 5-tuple, with all its packets having the same source and destination IP addresses and port numbers. Furthermore, 5-tuple flows are unidirectional (i.e., all of the 5-tuple flow packets travel in the same direction). Such 5-tuple flows are commonly referred to as microflows.

Existing tools for measuring streaming platforms include an integrated console that you can use to view the health of the instances and applications in a domain. IBM Streams is designed to address the following data processing platform objectives: parallel and high performance streams processing software platform that can scale over a range of hardware environments, automated deployment of stream processing applications on configured hardware, incremental deployment without restarting to extend stream processing applications, and secure and auditable run time environment. IBM Streams is especially powerful in environments where traditional batch or transactional systems might not be sufficient, for example: the environment must process many data streams at high rates, complex processing of the data streams is required, low latency is needed when processing the data streams. (Note: the term(s) "IBM STREAMS" and/or "STREAMS" may be subject to trademark rights in various jurisdictions throughout the world and are used here only in reference to the products or services properly denominated by the marks to the extent that such trademark rights may exist.)

SUMMARY

Embodiments of the present invention disclose a method, a computer program product, and a system for online path profiling by identifying heavy trafficked paths in streaming applications using data tuples, the method comprising: periodically executing a tuple submission application programming interface (API) and a tuple processing API; recording active paths using a profiler thread, wherein recording active paths comprises: taking snapshots of a current path index across threads; generating path usage information based on the recorded active path; generating a path usage graph based on the path usage information; and optimizing identified trafficked paths based on the path usage data and path usage map.

BRIEF DESCRIPTION OF THE DRAWINGS

FIG. 7 is a screenshot view within the data processing environment of FIG. 1, in accordance with an embodiment of the present invention.

DETAILED DESCRIPTION

Figure 1:
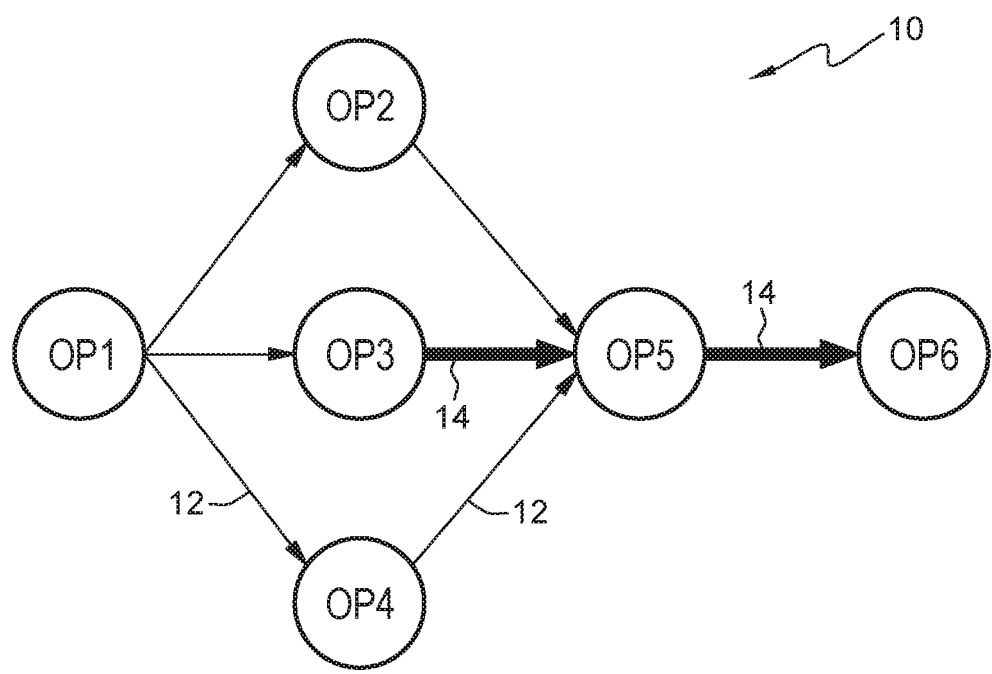
FIG. 1 is a diagram view showing data tuple flow information in a streaming application graph that is generated by and/or helpful in understanding embodiments of the present invention.

Knowing which path tuples flow through in a streaming application graph is important for developing and/or tuning high-performance streaming application. Embodiments of the present invention recognize that existing tools, for measuring or monitoring application streaming performance, do not provide insights into how tuples flow through streaming paths during runtime. More specifically, embodiments of the present invention recognize that current tools in the art do not provide insight into how tuples flow through different paths in a streaming application graph during runtime. Embodiments of the present invention recognize that the existing tools merely show the central processing unit (CPU) load on an operator and the aggregate traffic on a link between two operators, wherein a link is a connection between two adjacent operators. Additionally, embodiments of the present invention recognize that the existing tools provide percentages that represent the traffic intensity of link usage between two operators (i.e., how intensive data traverses through the links).

However, a link with high traffic may not indicate where most of the streaming traffic is coming from. For instance, the high traffic might be coming from paths upstream. A link with high traffic (i.e., a high traffic link) is a link with the most traffic relative to the other links in a system. Embodiments of the present invention recognize that link usage fails to capture the critical path and looking at the link usage alone may cause users to incorrectly identify the critical path. Additionally, existing tools only provide insight into operators and individual links between operators. For example, as shown in Figure (FIG. 1, system 10 comprises a communication fabric that includes traffic link (link) 12 and traffic link (link) 14. Link 14 has a relatively higher link rate as shown by a thick line, when compared to link 12 as shown by a thin line, wherein the wider link indicates more traffic between the operators. However, it is still difficult for developers to identify in the application code which upstream path contributes most to the link between Operator (OP) 5 and OP 6 because a higher link rate does not necessarily mean that the time spent on a particular path is longer. For example, the relatively heavy link traffic between OP 5 and OP 6 can come from 3 possible paths. First, a path originated from OP 1 to OP 2 to OP 5 to OP 6. Second, a path originated from OP 1 to OP 3 to OP 5 to OP 6. Third, a path originated from OP 1 to OP 4 to OP 5 to OP 6. Embodiments of the present invention recognize that existing tools are unable to identify which of the above three possible paths is the most heavily trafficked path because a highly trafficked link can be misleading.

Furthermore, embodiments of the present invention recognize that existing tools only provide the isolated metric for each operator and each link. Making it difficult for stream developers to understand the data tuple flow of the application (e.g., developers have difficulty: understanding how each type of tuples traverse the operator graph, identifying the critical path, and understanding or identifying how tuples distributed over a path). Additionally, traditional methods of token-based tracing can lead to significant performance overhead as well as memory overhead. Understanding how each type of tuples traverse the operator graph, identifying the critical path, and understanding and/or identifying how tuples are distributed over a path is important to make sense of a streaming application as well as performance profiling and performance tuning of a streaming application.

Embodiments of the present invention improve the art of developing, profiling and/or tuning a high-performance streaming application by solving the particular problems stated above. Embodiments of the present invention improve the art of path profiling in streaming applications by identifying the most heavily trafficked path in the application graph via runtime collection and analysis of thread execution statistics by tracking and identifying how tuples flow through streaming paths during runtime and provide insight into how tuples flow through different paths in a streaming application graph during runtime.

For example, in current tools, the console can display the aggregate traffic on a link between two adjacent operators connected by the link. However, a link with high traffic may not indicate which possible paths upstream the traffic is coming from. Embodiments of the present invention can identify the most heavily trafficked path in the application graph via runtime collection and analysis of thread execution statistics. Embodiments of the present invention can identify one of the most heavily trafficked paths in a data stream. For example, depicted in FIG. 1, OP 1 to OP 2 to OP 5 to OP 6 is the most heavily trafficked path in the data stream, not OP 1 to OP 3 to OP 5 to OP 6, described in further detail in FIG. 7. Namely, a user is unable to deduce the traffic of a path simply by aggregating all the link traffic along a path. Additionally, embodiments of the present invention recognize that current tools only provide link traffic, not path traffic. Embodiments of the present invention improve the art by providing path traffic to a user, which can enable the user to identify the most heavily trafficked path.

Thus, embodiments of the present invention improve the current art by enabling stream developers to understand the tuple flow of the application (e.g., understanding how each type of tuples traverse the operator graph, identifying the critical path, and understanding or identifying how tuples distributed over a path).

Implementation of embodiments of the invention may take a variety of forms, and exemplary implementation details are discussed subsequently with reference to the figures (i.e., FIG. 1-FIG. 8).

Figure 2:
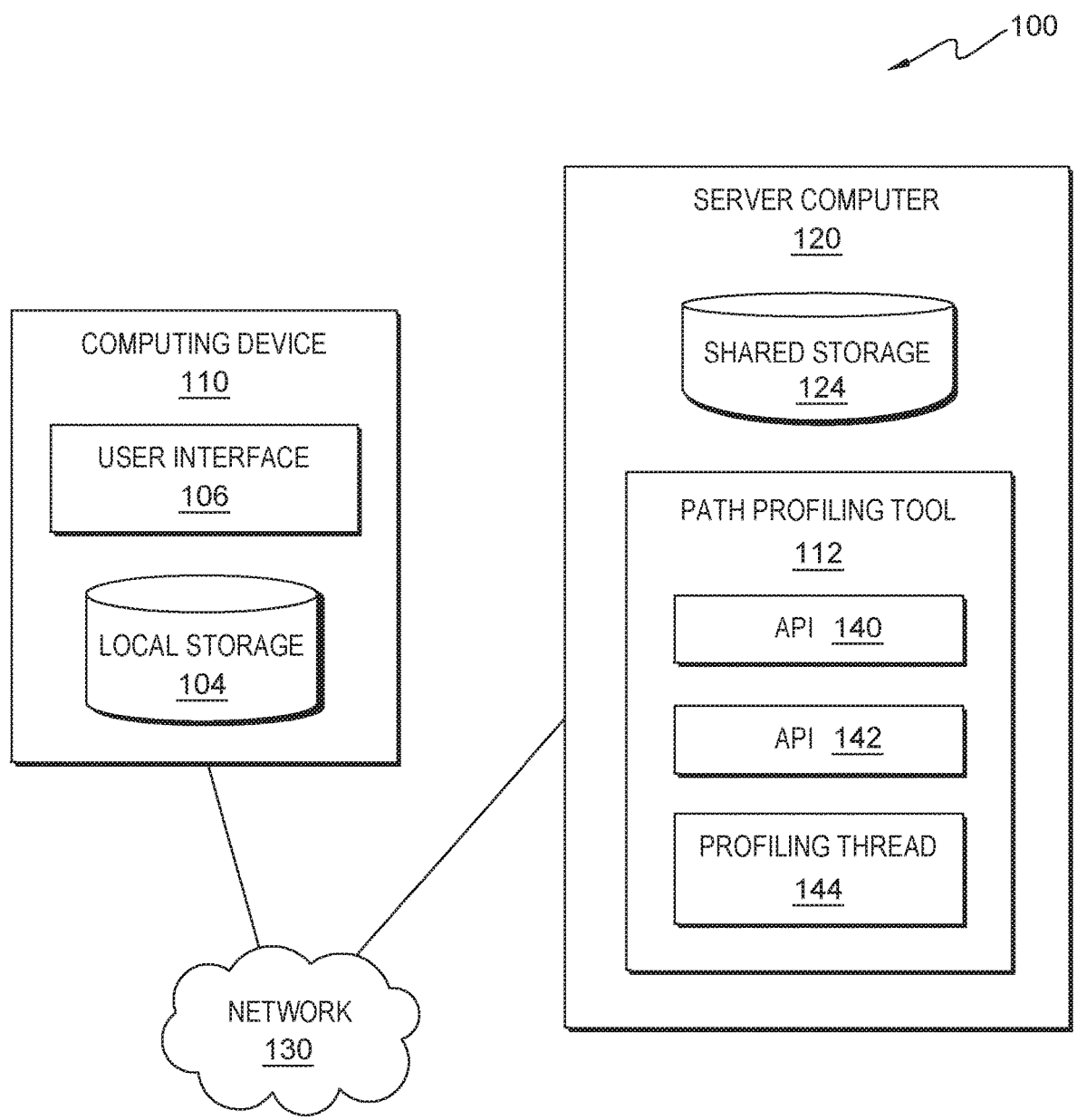
FIG. 2 is a functional block diagram illustrating a distributed data processing environment, in accordance with an embodiment of the present invention.

The present invention will now be described in detail with reference to the Figures (FIG.). FIG. 2 is a functional block diagram illustrating a distributed data processing environment, generally designated 100, in accordance with one embodiment of the present invention.

FIG. 2 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130. In various embodiments of the present invention, distributed data processing environment 100 can include a plurality of computing device 110 and a plurality of server computer 120.

Network 130 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video information. In general, network 130 can be any combination of connections and protocols that can support communications between computing device 110 and server computer 120, and any other computing devices and/or storage devices (not shown in FIG. 2) within distributed data processing environment 100.

In some embodiments of the present invention, computing device 110 can be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 can be representative of any programmable computing device or a combination of programmable computing devices capable of executing machine-readable program instructions and communicating with users of other computing devices via network 130 and/or capable of executing machine-readable program instructions and communicating with server computer 120.

In some embodiments of the present invention, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 can include an instance of user interface (interface) 106 and local storage 104. In various embodiments, not depicted in FIG. 1, computing device 110 can have a plurality of user interfaces. In other embodiments, not depicted in FIG. 1, distributed data processing environment 100 can comprise a plurality of computing devices, plurality of server computers, and/or one a plurality of networks. Computing device 110 can include internal and external hardware components, as depicted, and described in further detail with respect to FIG. 2.

User interface (interface) 106 provides an interface to path profiling tool (profiling tool) 112. Computing device 110, via user interface 106, can enable a user and/or a client to interact with profiling tool 112 and/or server computer 120 in various ways, such as sending program instructions, receiving program instructions, sending and/or receiving messages, updating data, sending data, inputting data, editing data, collecting data, and/or receiving data. In one embodiment, interface 106 can be a graphical user interface (GUI) or a web user interface (WUI) and can display at least text, documents, web browser windows, user options, application interfaces, and instructions for operation. Interface 106 can include information (such as graphic, text, and sound) presented to a user and control sequences the user employs to control operations. In another embodiment, interface 106 can be a mobile application software providing an interface between a user of computing device 110 and server computer 120. Mobile application software, or an "app," can be designed to run on smart phones, tablet computers and other computing devices. In an embodiment, interface 106 can enable the user of computing device 110 to at least send data, input data, edit data (annotations), collect data and/or receive data.

Server computer 120 can be a standalone computing device, a management server, a web server, a mobile computing device, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can represent a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 8.

Each of shared storage 124 and local storage 104 can be a data/knowledge repository and/or a database that can be written and/or read by one or a combination of profiling tool 112, server computer 120 and computing device 110. In the depicted embodiment, shared storage 124 resides on server computer 120 and local storage 104 resides on computing device 110. In another embodiment, shared storage 124 and/or local storage 104 can reside elsewhere within distributed data processing environment 100, provided that each can access and is accessible by computing device 110 and server computer 120. Shared storage 124 and/or local storage 104 can each be implemented with any type of storage device capable of storing data and configuration files that can be accessed and utilized by server computer 120, such as, but not limited to, a database server, a hard disk drive, or a flash memory.

In some embodiments of the present invention, shared storage 124 and/or local storage 104 can each be a hard drive, a memory card, a computer output to laser disc (cold storage), and/or any form of data storage known in the art. In some embodiments, shared storage 124 and/or local storage 104 can each be one or more cloud storage systems and/or databases linked to a cloud network. In various embodiments, shared storage 124 and/or local storage 104 can access, store, and/or house physical event data, and/or data shared throughout distributed data processing environment 100.

In the depicted embodiment of the present invention, API 140 and API 142 are each executed on server computer 120. In other embodiments of the present invention, API 140 and/or API 142 can be executed anywhere in distributed data processing environment 100 as long as API 140 and/or API 142 are in communication with profiling tool 112, computing device 110 and/or server computer 120. In the depicted embodiment of the present invention, API 140 operates as a submission API (e.g., tuple submission API) and API 142 acts as a processing API (e.g., tuple procession API).

In various embodiments of the present invention, profiling tool 112 is executed on server computer 120. In other embodiments, profiling tool 112 can be executed on computing device 110. In some embodiments, profiling tool 112 can be located and/or executed anywhere within distributed data processing environment 100 as long as profiling tool 112 can communicate with server computer 120, computing device 110, API 140, and/or API 142. In various embodiments, profiling tool 112 can be connected to and communicates with computing device 110 and/or server computer 120. In the depicted embodiment of the present invention, profiling tool 112 comprises API 140, API 140, and profiling thread 144. Profiling thread 144 enables a user to identify and isolate bottle necks in a code stack. Additionally, the thread profiles collected in the chosen time window are listed, along with the thread count, CPU time and memory details.

Figure 3:
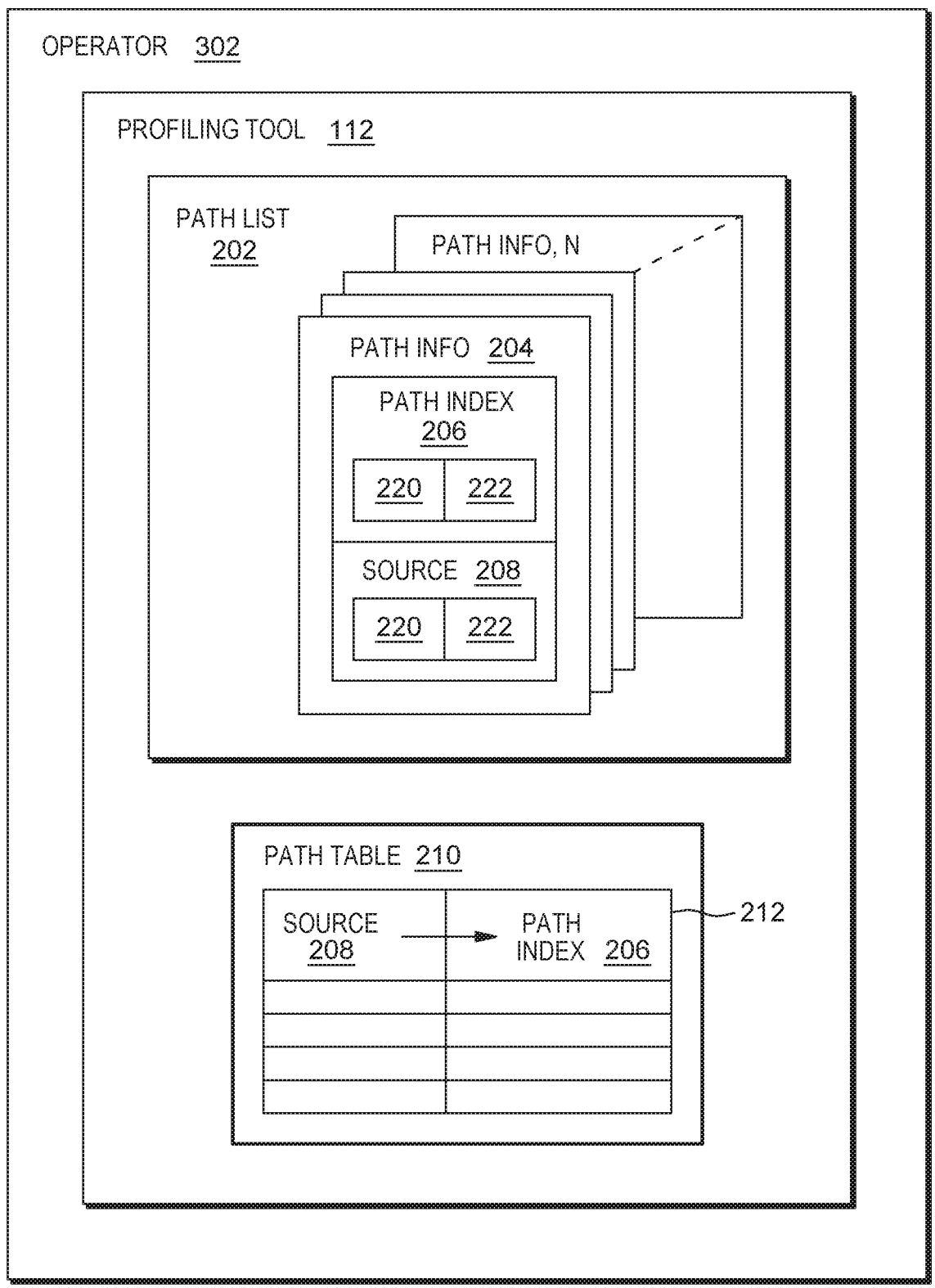
FIG. 3 is a perspective view of a data structure of a path profiling tool inside an operator within the data processing environment of FIG. 2, in accordance with an embodiment of the present invention.

In various embodiments of the present invention, profiling tool 112 utilizes distributed path encoding to reduce the logging and tracking overhead and to generate path usage information in streaming applications. In various embodiments of the present invention, profiling tool 112 operates inside an operator. One embodiment of the data structure of profiling tool 112 inside an operator N (i.e., OP 302) is shown in FIG. 3. FIG. 3 is a perspective view illustrating various portions of a computing environment in accordance with one embodiment of the present invention. In this particular embodiment, the data structure of profiling tool 112 inside OP 302 comprises path list 202, path information (info) 204, my path index 206 (i.e., current path index), source path index 208, and path table 210. Path list 202 is the list of all the paths an operator is on or has operated on. Path info 204 is stored in the path list 202, and consists of the current path index (my path index 206) and the path index (source path index 208) carried along the upstream. The current path index consists of operator index 220 and corresponding path index 222 (i.e., the designated path the tuple has taken associated with index of corresponding Path info 204 stored in path list 202). Source path index 208 consists of the previous operator index 220 and the previous corresponding path index 222 (i.e., the source of the tuple). Path table 210 establishes the mapping from source path index 208 and my path index 206 (i.e., path 212), wherein path table 210 comprises multiple path 212's and path table 210 is used when tuples are received along the tracing API (i.e., API 140). The current path index (my path index 206) can identify and list the operator and index (i.e., Idx), wherein the Idx is the index in the path list and is categorized under path info 204 and stored on path list 202 (e.g., pathList[Idx]).

Selectively, data records ingested by profiling tool 112 for the streaming graph undergo a different set of submission API (i.e., API 140 and API 142) to profile the path information. In various embodiments of the present invention, profiling tool 112 can create two new APIs (e.g., API 140 and API 142), including submit(tuple, SourcePathIndex), shown in Source 1 below, and process(tuple, SourcePathIndex), shown in Source 2 below. The tuple submission API (i.e., API 140), represented in Source 1, is embedded with distribute path encoding depicted in Source 1. In various embodiments of the present invention, the tuple process API (i.e., API 142) is embedded with the distributed path encoding recited in Source 2. In the new APIs (i.e., API 140 and API 142), a new SourcePathIndex is passed as a parameter, in addition to the original tuple parameter. This new parameter encodes the path that the tuple is coming from.

```
Source 1: void process( )
{
tuple=createTuple( );
if (tracingOn){
   submit(tuple, sourcePathIndex);
}
else {
   submit(tuple);
}
}
Source 2: void process(tuple, sourcePathIndex)
{
   //check if connection has established
   if (sourcePathIndex not in pathTable) {
      idx=pathList.size( )
      // create new PathIndex and establish the upstream
         connection
      myPathIndex=pair(myOPIdx, idx)
      PI=new PathInfo(myPathIndex, sourcePathIndex)
      pathTable[sourcePathIndex]=myPathIndex
      pathList.append(PI)
   }
   else{
      myPathIndex=pathTable[sourcePathIndex]
   }
   //normal processing logic
   process(tuple)
}
```

The new submit( ) and process( ) APIs (i.e., API 140 and API 142) are called only when the flag tracingOn is turned on. Otherwise, the regular submit(tuple) and process(tuple) APIs are used. The submit( ) API (API 140) is used by an operator to submit a tuple to a downstream operator. The process( ) API (API 142) is used by an operator to process an incoming tuple from an upstream operator. In various embodiments of the present invention, profiling tool 112 can instruct API 140 and API 142 to periodically submit and process tuples, respectively. Tuples flow through the paths based on the application logic implemented inside the operators in the streaming application graph.

For each operator, two data structures are maintained: path list 202 and path table 210. The first data structure, path list 202, keeps the list of all the paths this operator is on. Each entry stored in the path list 202, referred to as path info 204, consists of the current path index (i.e., my path index 206) and the path index carried along from the upstream operators (i.e., source path index 208). The second data structure, path table 210, establishes the mapping from source path index 208 to my path index 206, which can be used when receiving tuples via the process(tuple, source path index 208) API (i.e., API 142). Path table 210 is used to determine if an operator has previously received any data tuple from the same source path index 408. If an operator has not previously received any data tuple from the same source path index 408 then a new entry of path info 204 is appended to path list 202 and a new mapping is also appended to path table 210.

Figure 4:
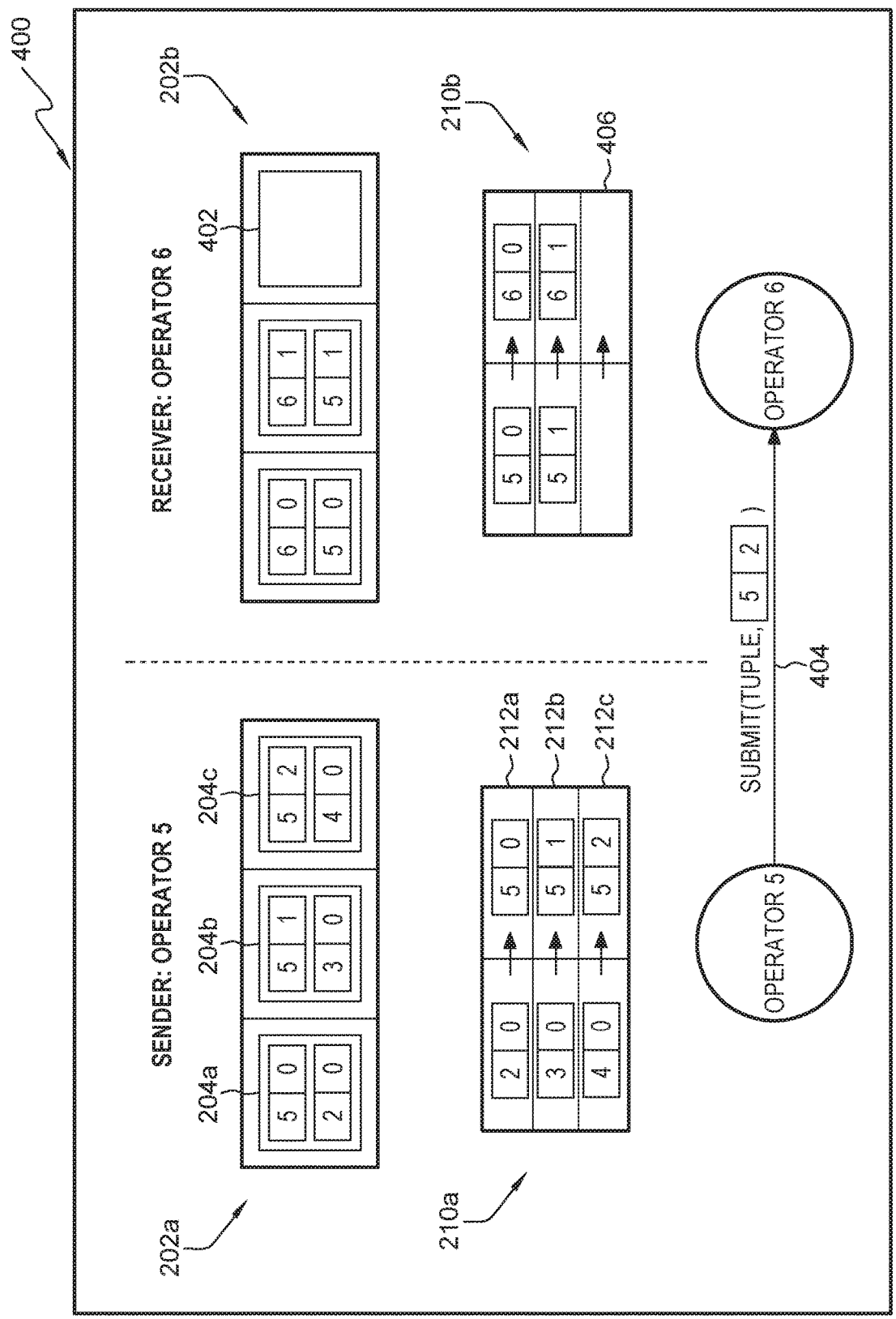
FIG. 4 is a screenshot view within the data processing environment of FIG. 2, in accordance with an embodiment of the present invention.

The distributed path encoding reduces synchronization overhead and distributes the workload to capture the path information. Each thread maintains thread-local variables to store the current path index. FIG. 4 shows screenshot 400 illustrating various portions of the profiling tool system in accordance with one embodiment of the present invention. Screenshot 400 provides an example of path list 202, path info 204 and path table 210 for an OP thread between OP 5 and OP 6. FIG. 4 comprises communication thread 404 between OP 5 and OP 6. In this example, OP 5 comprises path list 202a, wherein path list 202a comprises path info 204a, path info 204b, and path info 204c. Additionally, OP 5 comprises path table 210a, wherein path table 210a comprises path 212a, path 212b, and path 212c, wherein path 212a, path 212b, and path 212c each comprises path history of a submitted tuple through operators in a system.

In this example, as depicted in FIG. 4, OP 5 sends the tuple received from OP 4 to OP 6, via communication thread 404, wherein OP 5 is the sender and OP 6 is the receiver. In this example, the submitted tuple (e.g., submit(tuple, [5][2]) comprises two 32 bits. The first 32 bits is the operator index (operator index 220) which is 5 (i.e., the tuple is processing at OP 5 thus the operator index is 5). The second 32 bit is the index of corresponding path info 204 stored in path list 202a (i.e., path index 222), wherein path index 222 is pathList[2], in this particular example. Thus, the submitted tuple is [5][2], which is stored and displayed on path info 204c. Path info 204a, 204b, and 204c comprises my path index 206 and source path index 208 carried along through the tuple submission. In this example, when OP 6 receives the tuple from OP 5 then profiling tool 112 creates a new entry (i.e., path info block 402 of path list 202b) on OP 6.

In this example, path info block 402 in OP 6 path list indicates the path information relating to the path taken by the tuple prior to being received by OP 6 (source path index 208) and the current path information (my path index 206). In this example, OP 5 submitted the tuple to OP 6, thus source path index 208 for path info block 402 in OP 6 is [5][2] and my path index 206 for path info block 402 in OP 6 is [6][2]. Similarly, path table 210 illustrates the path taken by the tuple from source path index 208 to my path index 206. For example, communication thread 404 is entered into path table 210b of OP 6 as path 406, which would be entered as [5][2] to [6][2]. In various embodiments of the present invention, when a worker processes the tuple submitted through the API 142, profiling tool 112 updates the pre-work state current path with the corresponding path index (e.g., my path index 206). A worker is a computing process, wherein the computing process is the instance of a computer program that is being executed by one or many threads and contains the program code and its activity.

In various embodiments of the present invention, profiling thread 144 takes the snapshot of the current path index across threads. The aggregated snapshot is used to analyze the evolution and profiling information of paths. In various embodiments of the present invention, profiling tool 112, via profiling thread 144, periodically takes a snapshot of the current path state of each Operator (OP) thread, depicted in FIG. 4, and increment the counter maintained for each current path found in the snapshot, illustrated by Table 1 below. This is equivalent to taking periodical snapshots and observing how data tuples are traversing the various paths.

TABLE 1

Path Counter and Index.

| Path Index | [2][0] | [3][0] | [4][0] | [5][0] | [5][1] | [5][2] | [6][0] | [6][1] | [6][2] | ...n |
|---|---|---|---|---|---|---|---|---|---|---|
| Count | 1 | 2 | 3 | 4 | 5 | 6 | 7 | 8 | 9 | ...n |

When a snapshot is taking place, we have the current path index of each worker thread. In various embodiments of the present invention, profiling tool 112 can instruct a path counter process to analyze the statistics of the path counts from the table maintained in Table 1. In one example, the current path of worker 1 is [2][0], because worker 1 is processing a tuple at OP 2, and the path list is zero (i.e., pathList[0]) of OP 2, thus OP 2 has a current path index (i.e. my path index 206) value of [2][0]. This means that the tuple has traversed the path and is represented as traveling from OP 1 to OP 2. The counter of [2][0] can be incremented by 1. In another example, the current path of worker 2 is [6][2], because worker 2 is processing a tuple at OP 6, and the path list the tuple has taken is 2 (i.e., pathList[2]) of OP 6, thus OP 6 has a current path index (my path index 206) value of [6][2]. This means that the tuple has traversed the data path and is represented as traveling from OP 4 to OP 5 to OP 6.

In various embodiments of the present invention, profiling tool 112 can construct the full path, OP 4 to OP 5 to OP 6, from the current path of [6][2] in OP 6 by the algorithm outlined in Source 3. For example, in FIG. 4, profiling tool 112 can start by analyzing the current path index [6][2] to identify the first (i.e., current) operator which is OP 6. Continuing the example, profiling tool 112 can then identify the corresponding source path index [5][2], and identify the next operator which is OP 5 from path list 202 of OP 5, profiling tool 112 can identify the next operator in the thread which is OP 4 and so on until the end of the operator thread is reached (i.e., the initial operator in the streaming path is identified).

Source 3:
void trace(PathIndex PI)
{
  // on Operator PI.OP
  pathinfo=pathList[PI.Idx]
  list.append(PI.OP)
  sPI=pathInfo.sourcePathIndex
  while (exsists sPI) {
    //on Operator sPI.OP
    pathInfo=pathList[sPI.idx]
    list.append(sPI.OP)
    sPI=pathInfo.sourcePathIndex
  }
  list=list.reverse( )
}

Figure 5:
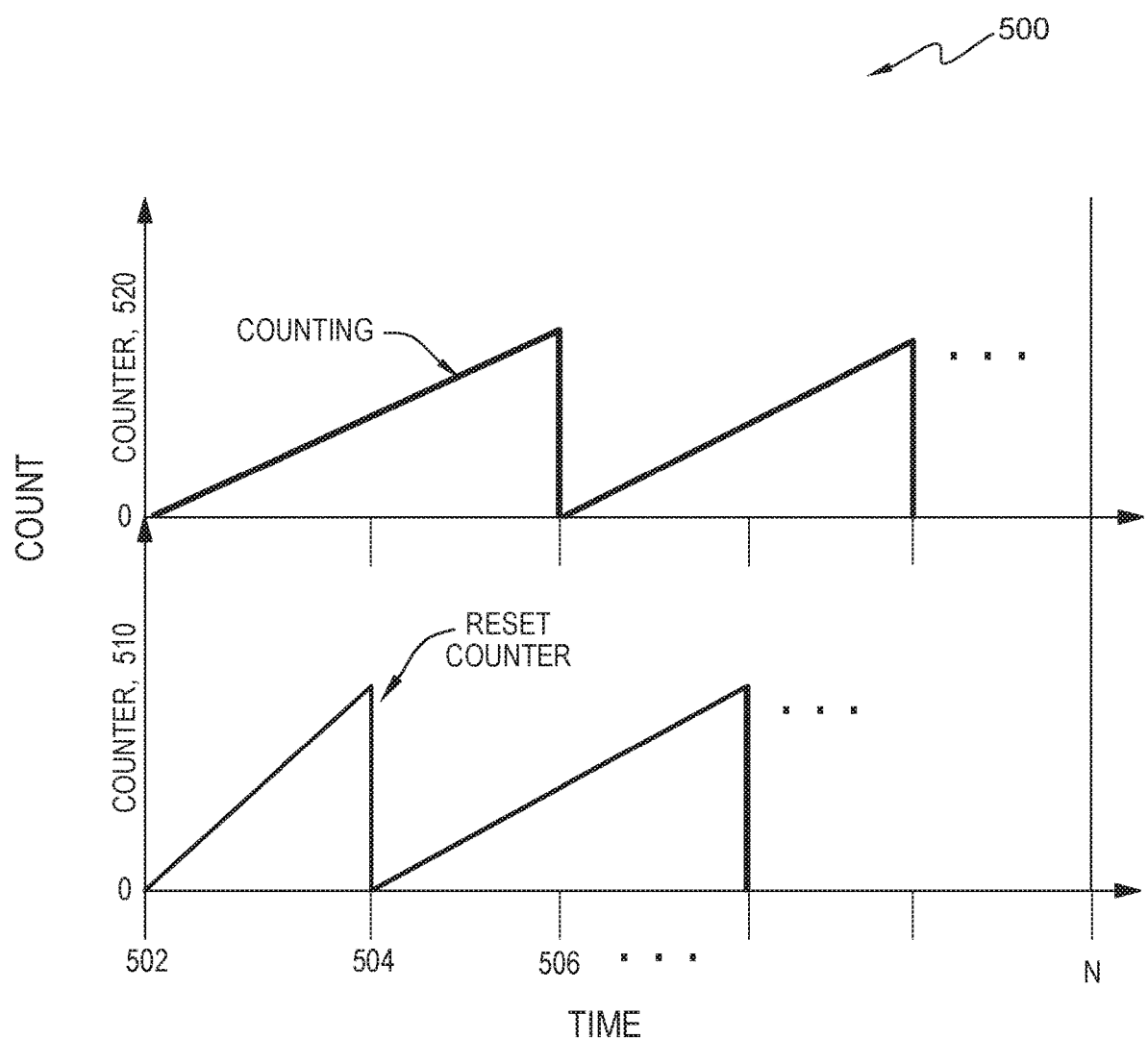
FIG. 5 is a graph view within the data processing environment of FIG. 2, in accordance with an embodiment of the present invention.

In various embodiments of the present invention, the statistical analysis of the path counts from the table could be a simple conversion of the individual counts to corresponding percentages of the total count. In order to adapt to the workload changes with time while preserving historic statistics, profiling tool 112 utilizes a two-path counter process. Namely, each counter process maintains a table, shown in Table 1. When a snapshot is taken by profiling tool 112, both path counter processes update their own tables, respectively. However, when it comes time to report the path usage statistics, only one of the two path counter processes can be reported, as depicted in FIG. 5. FIG. 5 is a graph view illustrating various portions of path counter system, illustrated by graph 500 in accordance with one embodiment of the present invention.

Graph 500 shows counting activity of counter 510 and counter 520 over time to illustrate how one counter rests to zero while the other starts a new count. In FIG. 5, path counter 520 and path counter 510 are over lapping path counts for profiling data streams that alternate captured reporting path usage statistics and dropping past path history. After reporting the path usage statistics, the path counter process resets the table to zero. In this particular embodiment, at time 502 to time 504 path counter 510 reports the path usage statistics to profiling tool 112 and then it drops the past history and resets its table to zero. In this particular embodiment, at time 506 the two path counters switch roles and path counter 520 reports the path usage statistics to profiling tool 112, drops the past path history and resets its table to zero. In this particular embodiment, both counter processes perform counting at all times while only one reports the path usage statistics alternatively until Time N (the counters time out or are instructed to stop). The overlapping of two processes is to ensure that any two consecutive reports can contain overlapping historical statistics.

For example, profiling tool 112 utilizes a profiler thread to periodically take snapshots of the current path state of each worker and increment the counts for the path inside the snapshot. In one particular example, profiling tool 112 utilizes two sets of overlapping path counters for profiling, illustrated by FIG. 5. Profiling tool 112 can adapt to the workload change while preserving historic information. In the depicted embodiment, both path counters (Path counter 520 and Path counter 510) are actively updated at the same time, but only one path counter is used to report the statistical information to an external interface (e.g., interface 106. In this example, each path counter performs periodic resets in order to observe workload changes. In the depicted embodiment, the shaded blocks indicate that the corresponding path counter is active.

In various embodiments of the present invention, each operator in the streaming graph maintains a lookup table. Based on the source of the data record and the upstream path index, a new path index is either generated or cane searched in the look-up table if the corresponding path index exists for tracking. The entire path can be recovered by the combination of the last path index and traversing back along the path through the look-up table since each operator only holds partial information. In various embodiments of the present invention, profiling tool 112 can trace back the path of the submitted tuple.

In one particular example, profiling tool 112 can trace back the operators by traversing the path index of the submitted tuple by (i) identifying the path information associated with the path index; (ii) identifying the path info stored in pathList(pathInex.idx); (iii) identifying the source path index through the path information; (iv) identifying the operator associated with the source path index; (v) repeating the process on the source operator; and (vi) exiting when no source path index can be found. The algorithm for tracing back a tuple path is depicted above in Source 3, wherein "list" is the upstream operators for the PathIndex.

In various embodiments of the present invention, once profiling tool 112 identifies the data paths, profiling tool 112 can output and display the identified data paths to a user via interface 106, wherein the identified and displayed data paths illustrate how the traffic is distributed among the data paths in the application stream. Such insights can enable performance tuning of the deployment of the application. In various embodiments of the present invention, if the traffic distribution is highly skewed, profiling tool 112 can take several actions. One possible action taken by profiling tool is adjusting the operator to processing element (PE) fusion, meaning two or more operators in the most trafficked path can be fused into a single PE. By fusing operators into a single PE, the inter-operator communications become functional calls. In contrast, if the operators in the highly trafficked path are fused to separate PE's, the network communication cost for the application would be higher, because PE to PE communication is done via a TCP/IP connection. Hence, properly fusing operators into a PE could significantly reduce network bandwidth when the application is deployed as a graph of processing elements (PE's).

Another possible action that can be taken by profiling tool 112 is applying parallelization to an operator that is on a highly trafficked path and is also computationally heavy. In this case, profiling tool 112 can split the heavy traffic into the heavy operator among multiple instances of the heavy operator resulting in the distribution of the traffic onto multiple data paths. In various embodiments of the present invention, the parallelization to a heavily traffic operator occurs concurrently.

Figure 6:
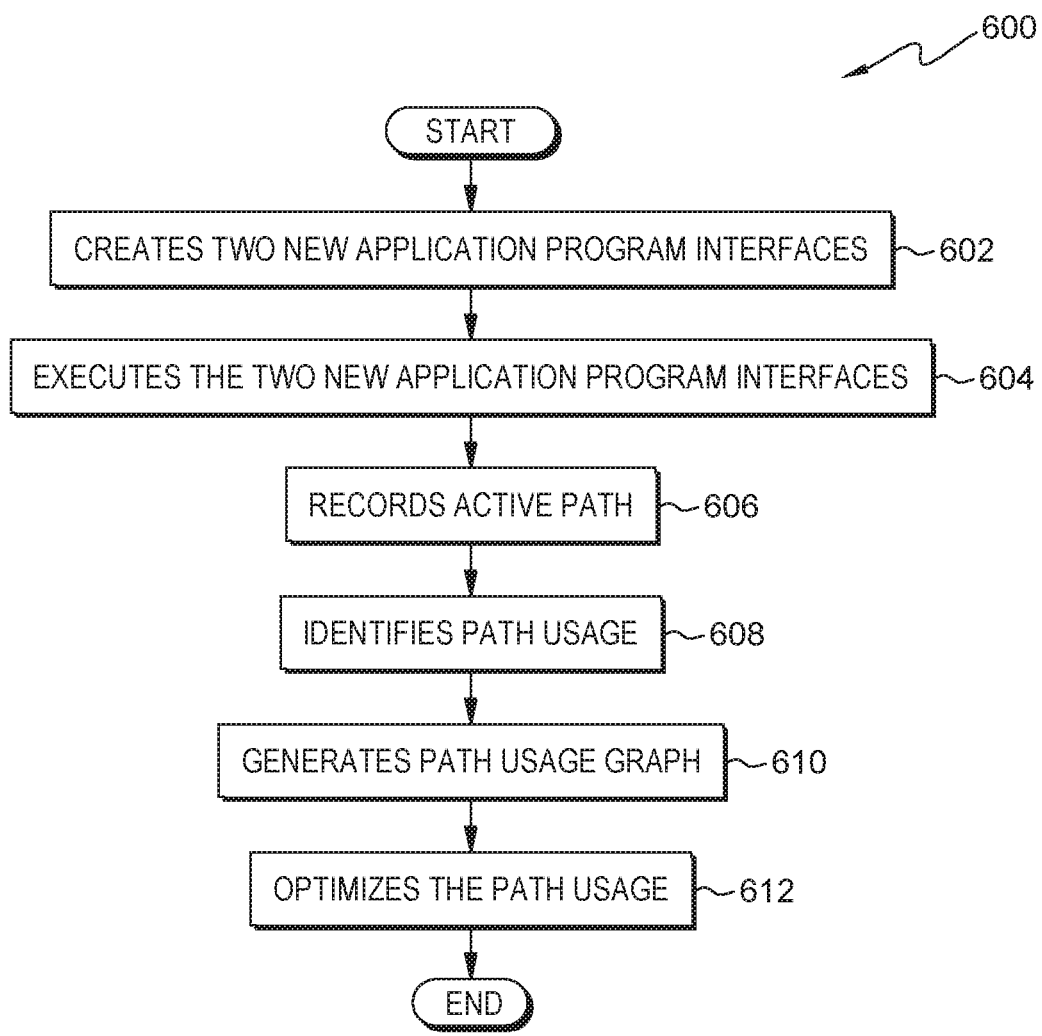
FIG. 6 is a flowchart depicting operational steps of the path profiling tool, on a proxy server computer within the data processing environment of FIG. 1, for identifying heavy trafficked paths using data tuples, in accordance with an embodiment of the present invention.

FIG. 6 illustrates operational steps of profiling tool 112, generally designated 600, in communication with computing device 110 and/or server computer 120, within distributed data processing environment 100 of FIG. 1, for identifying heavily trafficked paths in streaming applications using data tuples, in accordance with an embodiment of the present invention. FIG. 6 provides an illustration of one implementation and does not imply any limitations with regard to the environments in which different embodiments can be implemented. Many modifications to the depicted environment can be made by those skilled in the art without departing from the scope of the invention as recited by the claims.

In step 602, profiling tool 112 generates two new API's (i.e., API 140 and API 142). In various embodiments of the present invention, profiling tool 112 can generate two new API's and utilize the distributed path encoding in the new API's to reduce the logging and tracking overhead and to generate path usage information.

In step 604, profiling tool 112 executes the two new APIs (i.e., API 140 and API 142). In various embodiments of the present invention, profiling tool 112 periodically submits and processes tuples through predetermined data paths, via API 140 and API 142 respectively. In various embodiments of the present invention, the periodic submission and processing of tuples through data paths can be predetermined.

In step 606, profiling tool 112 records an active path. In various embodiments of the present invention, profiling tool 112 can record one or more active paths, via a profiling thread. Each thread maintains thread-local variables to store in the current path index (my path index 206). In various embodiments of the present invention, profiling tool 112, via a profiling thread, takes the snapshot of the current path index across the threads. In various embodiments of the present invention, profiling tool 112 can take snapshots of the current path index at each operator and each thread. Additionally, profiling tool 112 can aggregate snapshots. The aggregated snapshot is used to analyze the evolution and profiling information of paths. In various embodiments of the present invention, profiling tool 112, via a profiler thread, periodically takes a snapshot of the current path state of each Operator (OP) thread, and increment the counter maintained for each current path found in the snapshot, illustrated by Table 1. This is equivalent to taking periodical snapshots and observing how data tuples are traversing the various paths.

In step 608, profiling tool 112 identifies path usage. In various embodiments of the present invention, profiling tool 112 can identify the path usage of a streaming application using the snapshots taken by the profiler thread in step 606. In various embodiments of the present invention, each operator in the streaming graph maintains a lookup table. Based on the source of the data record and the upstream path index, a new path index is either generated or can be searched in the look-up table if the corresponding path index exists for tracking. The entire path can be recovered by the combination of the last path index and traversing back along the path through the look-up table since each operator only holds partial information.

In step 610, profiling tool 112 generates a path usage graph. In various embodiments of the present invention, profiling tool 112, via a profiler thread, generates a path usage graph, illustrated by FIG. 7. FIG. 7 is a screenshot view illustrating various portions of path usage graph, generally designated screenshot 700, in accordance with one embodiment of the present invention. In various embodiments of the present invention, the path usage is obtained through statistical analysis of the count for each path stored by the profiler thread. In various embodiments of the present invention, profiling tool 112 can display the path usage graph to a user via interface 106. The path usage displayed in FIG. 7 provides a more detailed description of the link usage of a path. In the depicted embodiment, the percentage on top of a link is the link usage of a path and the percentage on the left part of each path is the path usage. These percentages represent the traffic intensities (i.e., how intensive data traverse through the links).

Continuing the example stated above while discussing FIG. 1, FIG. 7 provides insight as to why OP 1 to OP 2 to OP 5 to OP 6 is the most heavily trafficked path in the data stream, not OP 1 to OP 3 to OP 5 to OP 6. In FIG. 7, profiling tool 112 provides a breakdown of link usage of a path and the percentage of each path usage. In this example, path 702 (OP 1 to OP 2 to OP 5 to OP 6) utilizes 40% of the path usage, path 704 (OP 1 to OP 3 to OP 5) utilizes 40% of the path usage, path 706 (OP 1 to OP 3 to OP 5 to OP 6) utilizes 10% of the path usage, and path 708 (OP 1 to OP 4 to OP 5 to OP 6) utilizes 10% of the path usage. Thus, path 702 (OP 1 to OP 2 to OP 5 to OP 6) is the most heavily trafficked path in the data stream despite the link usage in FIG. 1 depicting path 706 (OP 1 to OP 3 to OP 5 to OP 6) to be the most heavily trafficked path in the data stream. In various embodiments of the present invention, profiling tool 112 can display a path usage graph to the user, via interface 106. In various embodiments of the present invention, profiling tool 112 can visually alert and/or visually identify the user to the most trafficked path. The visual alert and/or visual identification can be highlighting, bolding, pulsating, and/or any other form of visual alerting known in the art to the identified most trafficked path.

In step 612, profiling tool 112 optimizes the path usage. In various embodiments of the present invention, profiling tool 112 can optimize the path usage based on the generated path usage graph. In various embodiments of the present invention, profiling tool 112 can optimize the path usage of identified trafficked paths by adjusting the operator to processing element (PE) fusion, meaning two or more operators in the most trafficked path can be fused into a single PE. By fusing operators into a single PE, the inter-operator communications become functional calls. In various embodiments of the present invention, profiling tool 112 can optimize the path usage of identified trafficked paths by applying parallelization to an operator that is on a highly trafficked path and is also computationally heavy. In this case, profiling tool 112 can split the heavy traffic into the heavy operator among multiple instances of the heavy operator. In various embodiment of the present invention, profiling tool 112 can guide a user during optimization of path usage by recommending paths to be optimized. In various embodiments of the present invention, profiling tool 112 can display an interactive prompt to the user, via interface 106, that can provide the user with step by step optimization guidance and optimization strategies, wherein the optimization strategies are previously used optimization techniques stored and retrieved from local storage 104 and/or shared storage 124.

Figure 8:
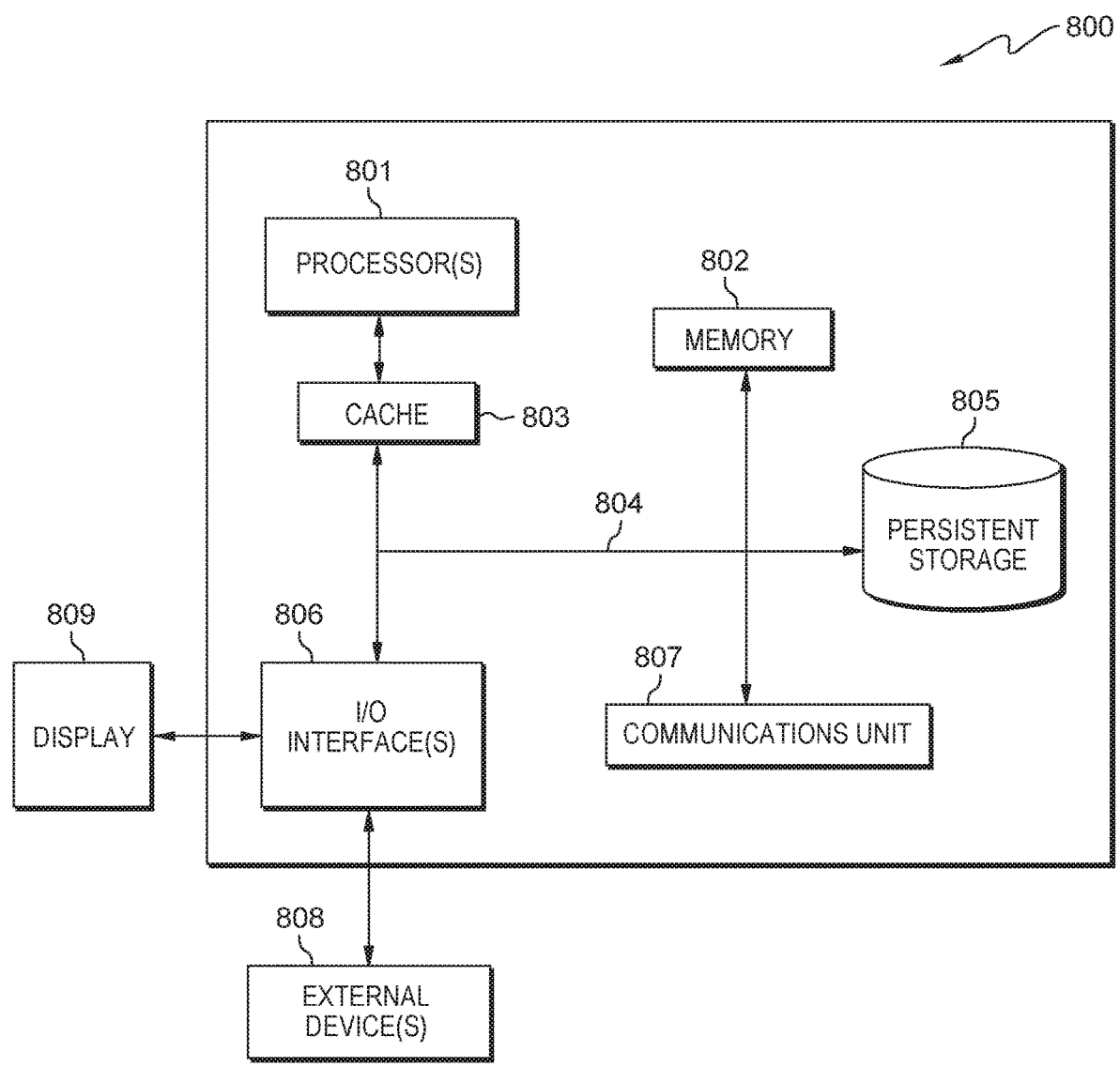
FIG. 8 is a block diagram of components of the proxy server computer executing the path profiling tool, in accordance with an embodiment of the present invention.

FIG. 8 depicts a block diagram of components of server computer 120 in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

FIG. 8 depicts computer system 800, where server computer 120 represents an example of computer system 800 that includes profiling tool 112. The computer system includes processors 801, cache 803, memory 802, persistent storage 805, communications unit 807, input/output (I/O) interface(s) 806, display 809, external device(s) 808 and communications fabric 804. Communications fabric 804 provides communications between cache 803, memory 802, persistent storage 805, communications unit 807, and input/output (I/O) interface(s) 806. Communications fabric 804 can be implemented with any architecture designed for passing data and/or control information between processors (such as microprocessors, communications, and network processors, etc.), system memory, peripheral devices, and any other hardware components within a system. For example, communications fabric 804 can be implemented with one or more buses or a crossbar switch.

Memory 802 and persistent storage 805 are computer readable storage media. In this embodiment, memory 802 includes random access memory (RAM). In general, memory 802 can include any suitable volatile or non-volatile computer readable storage media. Cache 803 is a fast memory that enhances the performance of computer processor(s) 801 by holding recently accessed data, and data near accessed data, from memory 802.

profiling tool 112 may be stored in persistent storage 805 and in memory 802 for execution by one or more of the respective computer processors 801 via cache 803. [If an element listed above is not a program (e.g., a data store, table, etc.) modify previous statement to read "for execution and/or access by one or more of the respective computer processors . . . "] In an embodiment, persistent storage 805 includes a magnetic hard disk drive. Alternatively, or in addition to a magnetic hard disk drive, persistent storage 805 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 805 may also be removable. For example, a removable hard drive may be used for persistent storage 805. Other examples include optical and magnetic disks, thumb drives, and smart cards that are inserted into a drive for transfer onto another computer readable storage medium that is also part of persistent storage 805.

Communications unit 807, in these examples, provides for communications with other data processing systems or devices. In these examples, communications unit 807 includes one or more network interface cards. Communications unit 807 may provide communications through the use of either or both physical and wireless communications links. profiling tool 112 may be downloaded to persistent storage 805 through communications unit 807.

I/O interface(s) 806 allows for input and output of data with other devices that may be connected to server computer 120. For example, I/O interface 806 may provide a connection to external devices 808 such as a keyboard, keypad, a touch screen, and/or some other suitable input device. External devices 808 can also include portable computer readable storage media such as, for example, thumb drives, portable optical or magnetic disks, and memory cards. Software and data used to practice embodiments of the present invention, e.g., profiling tool 112, can be stored on such portable computer readable storage media and can be loaded onto persistent storage 805 via I/O interface(s) 806. I/O interface(s) 806 also connect to a display 809.

Display 809 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for online path profiling by identifying heavy trafficked paths in streaming applications using data tuples, the method comprising:
   periodically executing a tuple submission application programming interface (API) and a tuple processing API;
   recording active paths using a profiler thread, wherein recording active paths comprises:
   taking snapshots of a current path index across threads;
   generating path usage information based on the recorded active path;
   generating a path usage graph based on the path usage information; and optimizing identified trafficked paths based on the path usage data and path usage map.

2. The computer-implemented method of claim 1 further comprising:
identifying the most heavily trafficked path in a application graph via runtime collection and analysis of thread execution statistics, wherein the analysis of the thread execution statistics comprises:
tracking tuples as they flow through streaming paths; and
identifying how tuples flow through the streaming paths during runtime based on the snapshots of the current path index across threads.

3. The computer-implemented method of claim 1 further comprising:
displaying a breakdown of link usage of a path and percentages of each path usage.

4. The computer-implemented method of claim 1 further comprising:
over lapping path counts for profiling data streams that alternate captured reporting path usage statistics and dropping past path history.

5. The computer-implemented method of claim 1, wherein optimizing identified trafficked paths comprises:
adjusting operators to processing element (PE) fusion, wherein adjusting the operators to PE fusion comprises two or more operators in the most trafficked path can be fused into a single PE.

6. The computer-implemented method of claim 1, wherein optimizing identified trafficked paths comprises:
applying parallelization to an operator that is on a highly trafficked path and is also computationally heavy, wherein applying the parallelization comprises:
splitting the heavy traffic into the heavy operator among multiple instances of the heavy operator.

7. The computer-implemented method of claim 1 further comprising;
guiding a user during the optimization of path usage by recommending paths to be optimized; and
visually alerting the user to the most trafficked path, wherein the visual alert comprises: highlighting, bolding, or pulsating the most trafficked path.

8. A computer program product for online path profiling by identifying heavy trafficked paths in streaming applications using data tuples, the computer program product comprising:
one or more computer readable storage devices and program instructions stored on the one or more computer readable storage devices, the stored program instructions comprising:
program instructions to periodically execute a tuple submission application programming interface (API) and a tuple processing API;
program instructions to record active paths using a profiler thread, wherein recording active paths comprises:
program instructions to take snapshots of a current path index across threads;
program instructions to generate path usage information based on the recorded active path;
program instructions to generate a path usage graph based on the path usage information; and
program instructions to optimize identified trafficked paths based on the path usage data and path usage map.

9. The computer program product of claim 8 further comprising:
program instructions to identify the most heavily trafficked path in an application graph via runtime collection and analysis of thread execution statistics, wherein the analysis of the thread execution statistics comprises:
program instructions to track tuples as they flow through streaming paths; and
program instructions to identify how tuples flow through the streaming paths during runtime based on the snapshots of the current path index across threads.

10. The computer program product of claim 8 further comprising:
program instructions to display a breakdown of link usage of a path and percentages of each path usage.

11. The computer program product of claim 8 further comprising:
program instructions to overlap path counts for profiling data streams that alternate captured reporting path usage statistics and dropping past path history.

12. The computer program product of claim 8, wherein optimizing identified trafficked paths comprises:
program instructions to adjust operators to processing element (PE) fusion, wherein adjusting the operators to PE fusion comprises two or more operators in the most trafficked path can be fused into a single PE.

13. The computer program product of claim 8, wherein optimizing identified trafficked paths comprises:
program instructions to apply parallelization to an operator that is on a highly trafficked path and is also computationally heavy, wherein applying the parallelization comprises:
program instructions to split the heavy traffic into the heavy operator among multiple instances of the heavy operator.

14. The computer program product of claim 8 further comprising;
program instructions to guide a user during the optimization of path usage by recommending paths to be optimized; and
program instructions to visually alert the user to the most trafficked path, wherein the visual alert comprises: highlighting, bolding, or pulsating the most trafficked path.

15. A computer system for online path profiling by identifying heavy trafficked paths in streaming applications using data tuples, the computer system comprising:
one or more computer processors;
one or more computer readable storage devices;
program instructions stored on the one or more computer readable storage devices for execution by at least one of the one or more computer processors, the stored program instructions comprising:
program instructions to periodically execute a tuple submission application programming interface (API) and a tuple processing API;
program instructions to record active paths using a profiler thread, wherein recording active paths comprises:
program instructions to take snapshots of a current path index across threads;
program instructions to generate path usage information based on the recorded active path;
program instructions to generate a path usage graph based on the path usage information; and
program instructions to optimize identified trafficked paths based on the path usage data and path usage map.

16. The computer system of claim 15 further comprising:
program instructions to identify the most heavily trafficked path in an application graph via runtime collection and analysis of thread execution statistics, wherein the analysis of the thread execution statistics comprises:
program instructions to track tuples as they flow through streaming paths; and
program instructions to identify how tuples flow through the streaming paths during runtime based on the snapshots of the current path index across threads.

17. The computer system of claim 15 further comprising:
program instructions to display a breakdown of link usage of a path and percentages of each path usage.

18. The computer system of claim 15 further comprising:
program instructions to overlap path counts for profiling data streams that alternate captured reporting path usage statistics and dropping past path history.

19. The computer system of claim 15, wherein optimizing identified trafficked paths comprises:
program instructions to adjust operators to processing element (PE) fusion, wherein adjusting the operators to PE fusion comprises two or more operators in the most trafficked path can be fused into a single PE.

20. The computer system of claim 15 further comprising;
program instructions to guide a user during the optimization of path usage by recommending paths to be optimized; and
program instructions to visually alert the user to the most trafficked path, wherein the visual alert comprises: highlighting, bolding, or pulsating the most trafficked path.

* * * * *